(12) United States Patent
Huang (10) Patent No.: US 10,700,993 B2
(45) Date of Patent: Jun. 30, 2020

(54) CONTROLLING MESSAGE OUTPUT (71) Applicant: Alibaba Group Holding Limited, George Town (KY)

(72) Inventor: Mengjun Huang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 83 days.

(21) Appl. No.: 15/818,504

(22) Filed: Nov. 20, 2017

(65) Prior Publication Data

US 2018/0077078 A1 Mar. 15, 2018

Related U.S. Application Data

(63) Continuation of application No. PCT/CN2016/080018, filed on Apr. 22, 2016.

(30) Foreign Application Priority Data

May 25, 2015 (CN) .......................... 2015 1 0268806

(51) Int. Cl.
*H04L 12/911* (2013.01)
*H04L 29/08* (2006.01)
(Continued)

(52) U.S. Cl.
CPC .............. *H04L 47/72* (2013.01); *H04L 29/08* (2013.01); *H04L 41/5051* (2013.01);
(Continued)

(58) Field of Classification Search
None
See application file for complete search history.

(56) References Cited

U.S. PATENT DOCUMENTS

| 5,163,046 A | * 11/1992 | Hahne ..................... H04L 47/16 370/237 |
| 8,782,211 B1 | * 7/2014 | Sharma ............... H04L 67/1036 709/224 |

(Continued)

FOREIGN PATENT DOCUMENTS

| CN | 1747454 | 3/2006 |
| CN | 101035013 | 9/2007 |

(Continued)

OTHER PUBLICATIONS

International Search Report issued in international Searching Authority issued in International Application No. PCT/CN2016/080018 dated Jul. 13, 2016; 8 pages.

(Continued)

*Primary Examiner* — Philip J Chea
*Assistant Examiner* — Hassan A Khan
(74) *Attorney, Agent, or Firm* — Fish & Richardson P.C.

(57) ABSTRACT

A duration to transmit multiple messages is calculated. A first request based on the calculated duration is transmitted. The first request is a request for reserving a time period to transmit. In response to receiving an approval of the first request, for each message in the multiple messages, a transmit time is calculated. A determination is made that a current time exceeds a particular transmit time for a particular message. In response to the determination, a second request is transmitted. The second request is a request for permission to transmit. In response to receiving an approval of the second request, the particular message is transmitted.

12 Claims, 7 Drawing Sheets

(51) Int. Cl.
*H04L 12/24* (2006.01)
*H04L 12/58* (2006.01)
*H04L 29/06* (2006.01)
*H04M 3/42* (2006.01)

(52) U.S. Cl.
CPC ............ *H04L 47/743* (2013.01); *H04L 51/00* (2013.01); *H04L 67/325* (2013.01); *H04L 67/42* (2013.01); *H04M 3/42382* (2013.01); *H04L 47/748* (2013.01); *H04L 47/781* (2013.01)

(56) References Cited

U.S. PATENT DOCUMENTS

| | | | | |
|---|---|---|---|---|
| 2002/0078214 | A1* | 6/2002 | Shindou | G06F 9/505 709/229 |
| 2006/0129766 | A1* | 6/2006 | Cassia | H04L 67/2847 711/137 |
| 2007/0002821 | A1* | 1/2007 | Carlson | H04L 29/06 370/349 |
| 2007/0143490 | A1* | 6/2007 | Gallou | H04N 21/6377 709/231 |
| 2008/0117816 | A1* | 5/2008 | Stone | H04L 43/0817 370/230.1 |
| 2009/0232103 | A1 | 9/2009 | Kesselman et al. | |
| 2010/0268798 | A1* | 10/2010 | Kourkouzelis | H04L 67/325 709/220 |
| 2010/0271947 | A1* | 10/2010 | Abdelal | H04L 47/263 370/235 |
| 2012/0078996 | A1* | 3/2012 | Shah | H04L 67/325 709/203 |
| 2014/0365554 | A1* | 12/2014 | Bleau | H04L 67/42 709/203 |
| 2015/0026525 | A1* | 1/2015 | Byrne | G06F 11/079 714/39 |
| 2016/0080484 | A1* | 3/2016 | Earl | H04L 67/1031 709/226 |
| 2016/0337253 | A1* | 11/2016 | Tang | H04L 47/28 |
| 2017/0264574 | A1* | 9/2017 | Leitch | H04L 47/266 |
| 2018/0115601 | A1* | 4/2018 | Qiu | H04L 69/16 |
| 2018/0173519 | A1* | 6/2018 | Enns | H04L 67/2828 |

FOREIGN PATENT DOCUMENTS

| | | |
|---|---|---|
| CN | 101547198 | 9/2009 |
| CN | 102404786 | 4/2012 |
| JP | 2002268981 | 9/2002 |
| JP | 2009075669 | 4/2009 |
| JP | 2010130440 | 6/2010 |
| JP | 2010191601 | 9/2010 |

OTHER PUBLICATIONS

European Extended Search Report in European Application No. 16799171.0, dated Jan. 9, 2019, 8 pages.
International Preliminary Report on Patentability in International Application No. PCT/CN2016/080018, dated Nov. 28, 2017, 10 pages (with English Translation).

* cited by examiner

CONTROLLING MESSAGE OUTPUT

CROSS REFERENCE TO RELATED APPLICATIONS

This application is a continuation of PCT Application No. PCT/CN2016/080018, filed on Apr. 22, 2016, which claims priority to Chinese Application No. 201510268806.3, filed on May 25, 2015, the entire contents of each which are hereby incorporated by reference.

BACKGROUND

Given rapid development of the Internet, traffic to servers on the Internet has increased dramatically. When one or more clients transmit multiple messages to a server within a short period of time, the server may not be able to handle the service load due to limited processing capability of the server.

SUMMARY

The present disclosure describes controlling message output.

In an implementation, a duration to transmit multiple messages is calculated. A first request based on the calculated duration is transmitted. The first request is a request for reserving a time period to transmit. In response to receiving an approval of the first request, for each message in the multiple messages, a transmit time is calculated. A determination is made that a current time exceeds a particular transmit time for a particular message. In response to the determination, a second request is transmitted. The second request is a request for permission to transmit. In response to receiving an approval of the second request, the particular message is transmitted.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the described approach can be used to enable controlling message output of a client. For example, before sending multiple messages to a server, the client first acquires a reserved time period for the multiple messages. Then the client sets a transmit time for each message of the multiple messages. Finally, the client transmits a particular message when the current time exceeds a corresponding transmit time for the particular message and permission to transmit the particular message is granted. In doing so, the message output of the client can be controlled. The client can output messages to a server in a uniform and stable way without overloading the server. As a result, stability of the server can be improved. Second, the described approach can maximize message output of the client without exceeding the maximum processing capability of the server. As a result, utilization of system resources can be improved. Third, the described approach utilizes a combination of global control and distributed control, so that the client outputs a steady and uniform service message. As a result, the operation stability of the server is improved. In addition, the processing capability utilization of the server can be maximized. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes controlling message output and, particularly, controlling how a client transmits service messages to a server without overloading the server. The detailed description is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In general, a server has a limited processing capability. The number of messages, transmitted by one or more clients to the server for processing, fluctuates over time. In addition, the time in which those messages are being transmitted is not uniformly distributed. When one or more clients transmit multiple messages to the server within a short period of time, the server may not be able to handle the service load due to the limited processing capability. To keep the server stable, a maximum number of concurrent links that can be maintained between the server and its clients is set. If the number of concurrent links exceeds the maximum number, new links cannot be created with the server (for example, new messages cannot be processed and will be denied by the server). However, controlling service load at server side based on processing capability of the server cannot prevent clients from outputting messages. For example, when a request to transmit a message is denied, a client may transmit the same request repeatedly.

At a high-level, the described approach provides a mechanism to automatically control message output on the client side. To transmit a message to a server for processing, a client first acquires a reserved time period for the message. Then the client sets a transmit time for the message. When the current time exceeds the transmit time for the message and permission to transmit the message is acquired, the client can transmit the message to the server for processing. By controlling message output on the client side, the number of messages as well as the time in which those messages are being transmitted can be controlled without overloading the server.

Figure 1:
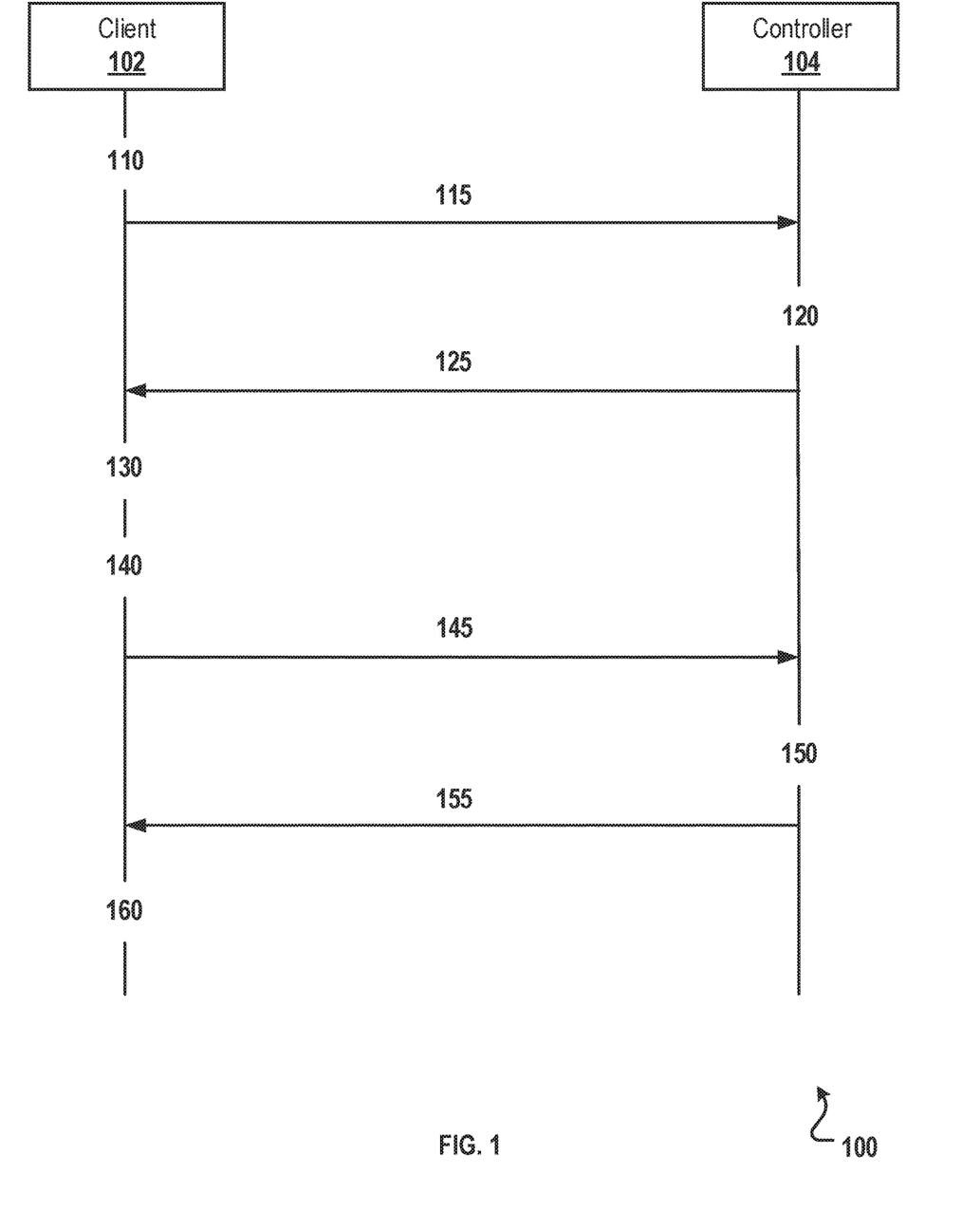
FIG. 1 is a swim diagram illustrating an example of a method for controlling message output, according to an implementation of the present disclosure.

FIG. 1 is a swim diagram illustrating an example of a method 100 for controlling message output, according to an implementation of the present disclosure. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some implementations, various steps of method 100 can be run in parallel, in combination, in loops, or in any order. In some implementations, the method 100 can include additional or different (or a combination of both) steps not shown in the swim diagram. In some implementations, various steps of method 100 can also be omitted from the method 100.

At 110, a client 102 calculates a duration to transmit one or more messages. The one or more messages (such as, business transactions in a same batch) are to be transmitted to a server for processing. For example, the server can provide services to one or more clients by processing messages sent by the one or more clients. In some implementations, the one or more clients and the server are independent computers, connected through the Internet, in a cluster mode. In some implementations, the one or more clients and the server are different applications, functional modules, or a combination of both, on a same computer. In some implementations, the duration is calculated based on the number of messages to be transmitted and a transmitting interval between two consecutive messages. For example, if the client 102 has 100 messages to send and can send a message every 100 milliseconds (ms), the calculated duration to transmit the 100 messages is 9900 ms. From 110, method 100 proceeds to 115.

At 115, the client 102 transmits a first request to a controller 104. The first request is a request for reserving a time period to transmit based on the calculated duration. The controller 104 can be a data processing functional module, and can include a database, a control unit, or both. For example, the controller 104 can maintain a number of concurrent links, established between a server and its clients, below a predetermined number (such as, a maximum number of concurrent links calculated based on the server's maximum processing capability). In some implementations, the controller 104 can be a distributed counting node (such as, TAIR, or MEMCACHE). The controller 104 can be configured in a message input port of a server, a unified message output port of one or more clients, or a separate or independent unit. In some implementations, the controller 104 allocates system resources (such as, processing capability of a server, network resources), to one or more clients, based on system resources, status of a server, and status of a requesting client.

In some implementations, the controller 104 manages a next available time for client reservation. For example, the next available time for reservation indicates that the time before the next available time for reservation has been allocated to, and reserved by, some clients. The next available time for reservation also indicates that the time after the next available time for reservation is available. Once an available time period is allocated to a requesting client, the controller 104 updates the next available time for reservation. For example, if the current time is 0 second (s) and a next available time ($T_0$) for reservation is 100 s, a client cannot reserve a time period to transmit between 0 s and 100 s, and can reserve a time period to transmit after 100 s (such as, a time period of $[T_0, T_0+T_1]$, where $T_1$ is the calculated duration to transmit, as discussed in step 110).

In some implementations, the next available time for reservation is public information. The controller 104 can broadcast the next available time for reservation periodically or every time the next available time for reservation is updated. In some implementations, the controller 104 can transmit the next available time for reservation to a client, in response to receiving an information query from the client. For example, before transmitting the first request to the controller 104, the client 102 obtains the next available time for reservation from the controller 104. The client 102 then calculates the time period to transmit as a time period between the next available time for reservation ($T_0$) and the sum of the next available time for reservation and the calculated duration ($T_0+T_1$), and transmits the first request including the time period ($[T_0, T_0+T_1]$) the client 102 wants to reserve. From 115, method 100 proceeds to 120.

At 120, in response to receiving the first request, the controller 104 determines a first response based on a predetermined rule. The first response is an approval or a denial of the first request. In some implementations, the predetermined rule is a first-come, first-served (FCFS) rule. When receiving requests for an available time period from more than one client, the controller 104 allocates the available time period to the client whose request is first received by the controller 104. As a result, an approval of the request is determined for the client, while requests from other clients are denied. For example, three clients ($C_1$, $C_2$, and $C_3$) obtain from the controller 104 that the next available time for reservation is 100 s. Client $C_1$ transmits a request to the controller 104 reserving a time period of [100 s, 110 s]. Client $C_2$ transmits a request to the controller 104 reserving a time period of [100 s, 130 s]. Client $C_3$ transmits a request to the controller 104 reserving a time period of [100 s, 115 s]. The controller 104 receives the request from client $C_1$ first. Based on the FCFS rule, the controller 104 allocates the time period of [100 s, 110 s] to client $C_1$, and updates the next available time for the reservation to 110 s. The controller 104 determines that a response to the request from client $C_1$ is an approval of the request. After receiving the request form client $C_2$, the controller 104 determines that part of the time period of [100 s, 130 s] is already reserved, and a response to the request from client $C_2$ is a denial of the request. After receiving the request form client $C_3$, the controller 104 determines that part of the time period of [100 s, 115 s] is already reserved, and a response to the request from client $C_3$ is a denial of the request. In some implementations, the predetermined rule is a rule based on a priority of a requesting client among other clients. From 120, method 100 proceeds to 125.

At 125, the controller 104 transmits the first response to the client 102. From 125, method 100 proceeds to 130.

At 130, in response to receiving an approval of the first request from the controller 104, the client 102 calculates a transmit time for each message in the one or more messages. For example, as discussed in step 120, client $C_1$ reserves the time period of [100 s, 110 s]. Within that time period, client $C_1$ has 100 messages to send and each message takes 100 ms to transmit. Client $C_1$ calculates a transmit time of 100 s for the first message, a transmit time of 100.1 s for the second message, and so on. A transmit time for the last message is calculated to be 109.9 s. In some implementations, the calculated transmit time for each message is stored in an output queue of the client 102. In some implementations, the output queue stores the one or more messages. The output queue can be a data storage, a processing unit, or a combination of both. In some implementations, the output queue is a first-in, first-out (FIFO) queue. In some implementations, the output queue can output messages at a predetermined frequency.

In some implementations, if the client 102 receives a denial of the first request from the controller 104 (such as, client $C_2$, client $C_3$ as discussed in step 120), the client 102 obtains an updated next available time for reservation. In some implementations, the updated next available time for reservation is included in the first response transmitted by the controller 104. In some implementations, the client 102 queries the controller 104 for the updated next available time for reservation. The client 102 then calculates an updated time period to transmit based on the updated next available time for reservation and transmits another request for reserving the updated time period to transmit. In some implementations, this (another) request is transmitted to the controller after waiting a predetermined time period. In some implementations, a reminder is displayed on the client 102 after receiving a predetermined number of denials from the controller 104. For example, as discussed in step 120, client $C_2$ fails to reserve the time period of [100 s, 130 s]. After obtaining the updated next available time for reservation (that is, 110 s), client $C_2$ transmits another request to the controller 104 reserving a time period of [110 s, 140 s]. In some implementations, the operations, performed by the client 102 after receiving a denial of the first request, are similar to those discussed in step 115. From 130, method 100 proceeds to 140.

At 140, the client 102 determines that a current time exceeds a particular transmit time for a particular message. In some implementations, the client 102 monitors the output queue, as discussed in step 130, periodically. When it is time to transmit a message in the output queue (that is, current time exceeds a transmit time of the message), the client 102 applies for permission to transmit the message. In some implementations, a process can be set at the client 102 to periodically scan (such as, scan every 1 s) the transmit time of each message stored in the output queue. When a particular transmit time of a particular message in the output queue is reached or passed, the client 102 can apply, for example, a concurrent token from the controller 104 to transmit the particular message. In some implementations, an expiration time is set. When the current time is greater than sum of the particular transmit time and the expiration time, a concurrent token cannot be applied for the particular message. From 140, method 100 proceeds to 145.

At 145, in response to determining that a current time exceeds a particular transmit time for a particular message, the client 102 transmits a second request to the controller 104. The second request is a request for permission to transmit the particular message. In some implementations, a concurrent token is used as permission to transmit. From 145, method 100 proceeds to 150.

At 150, in response to receiving the second request, the controller 104 determines a second response for the second request. In some implementations, the controller 104 first determines the number of concurrent links established at a server to which the client 102 intends to transmit the particular message. If the number of concurrent links at the server does not exceed a predetermined number, the controller 104 determines that the second response is an approval of the second request (such as, granting a concurrent token). However, if the number of concurrent links at the server exceeds the predetermined number, the controller 104 determines that the second response is a denial of the second request (such as, denying a concurrent token). In some implementations, the predetermined number is set based on the server's processing capability. From 150, method 100 proceeds to 155.

At 155, the controller 104 transmits the second response to the client 102. From 155, method 100 proceeds to 160.

At 160, in response to receiving an approval of the second request from the controller 104, the client 102 transmits the particular message to the server for processing.

In some implementations, if the client 102 receives a denial of the second request from the controller 104, the client 102 obtains a next available time for requesting permission. In some implementations, the next available time for requesting permission is included in the second response transmitted by the controller 104. In some implementations, the client 102 queries the controller 104 for the next available time for requesting permission. For example, the controller 104 can obtain a next available service time from the server (such as, an estimated time when the number of concurrent links at the server drops below the predetermined number), and set the next available time for requesting permission with the next available service time of the server. When a current time exceeds the next available time for requesting permission, the client 102 retransmits the second request to the controller 104. In some implementations, after receiving a denial of the second request from the controller 104, the client 102 retransmits the second request to the controller 104 after waiting for a predetermined time period. After 160, method 100 stops.

Figure 2:
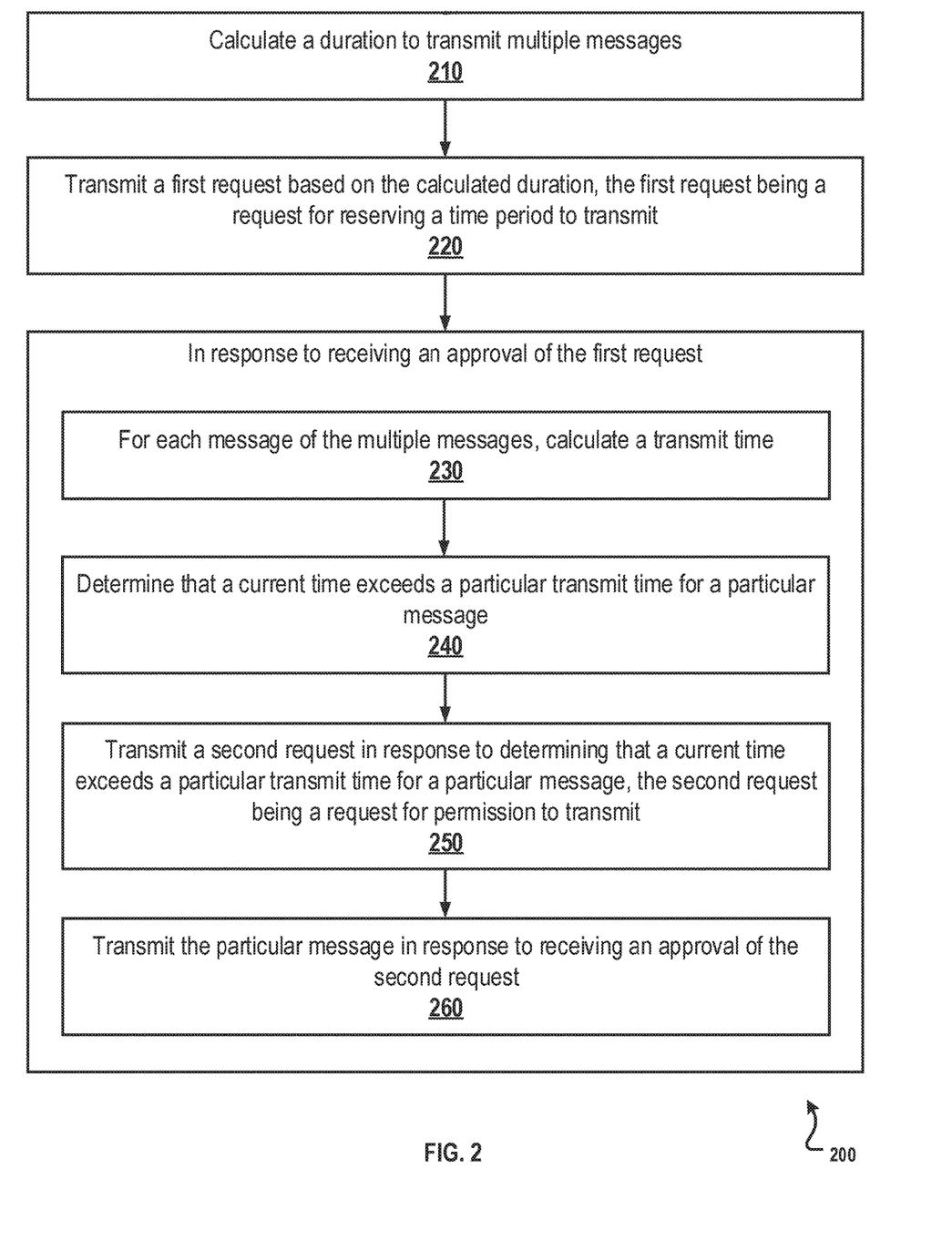
FIG. 2 is a flowchart illustrating an example of a method for controlling message output, according to an implementation of the present disclosure.

FIG. 2 is a flowchart illustrating an example of a method 200 for controlling message output, according to an implementation of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order. In some implementations, the method 200 can include additional or different (or a combination of both) steps not shown in the flowchart. In some implementations, various steps of method 200 can also be omitted from the method 200.

At 210, a duration to transmit multiple messages is calculated. In some implementations, the multiple messages are to be transmitted by a client to a server for processing. For example, monthly order information in a year is gathered and transmitted in a batch to a server, for processing. From 210, method 200 proceeds to 220.

At 220, a first request based on the calculated duration is transmitted. The first request is a request for reserving a time period to transmit the multiple messages. In some implementations, the time period is set as between a next available time for reservation and sum of the next available time for reservation and the calculated duration. From 220, method 200 proceeds to 230.

At 230, in response to receiving an approval of the first request, a transmit time is calculated for each message of the multiple messages. In some implementations, the calculated transmit time for each message is stored in an output queue of the client. In some implementations, the output queue stores the multiple messages. The output queue can be a data storage, a processing unit, or a combination of both. In some implementations, the output queue is a FIFO queue. In some implementations, the output queue can output messages at a predetermined frequency.

In some implementations, if receiving a denial of the first request, another request for reserving another time period can be transmitted. For example, an updated next available time for reservation is obtained. The another time period is set as between the updated next available time for reservation and sum of the updated next available time for reservation and the calculated duration. In some implementations, after receiving a predetermined number of denials, the client is provided with information related to the denials. In some implementations, after receiving the predetermined number of denials, the client cannot transmit anymore requests for reserving a time period. From 230, method 200 proceeds to 240.

At 240, a determination is made that a current time exceeds a particular transmit time for a particular message. In some implementations, transmit times of the multiple messages are scanned periodically. When the current time exceeds a particular transmit time for a particular message, a determination is made for the particular message. From 240, method 200 proceeds to 250.

At 250, in response to determining that a current time exceeds a particular transmit time for a particular message, a second request is transmitted. The second request is a request for permission to transmit the particular message. In some implementations, a concurrent token is used as permission to transmit. From 250, method 200 proceeds to 260.

At 260, in response to receiving an approval of the second request, the particular message is transmitted. In some implementations, if receiving a denial of the second request, the second request can be retransmitted. For example, a next available service time is obtained. When the current time exceeds the next available service time, the second request is retransmitted. In some implementations, after receiving a denial of the second request, the second request is automatically retransmitted after waiting for a predetermined time period. After 260, method 200 stops.

Figure 3:
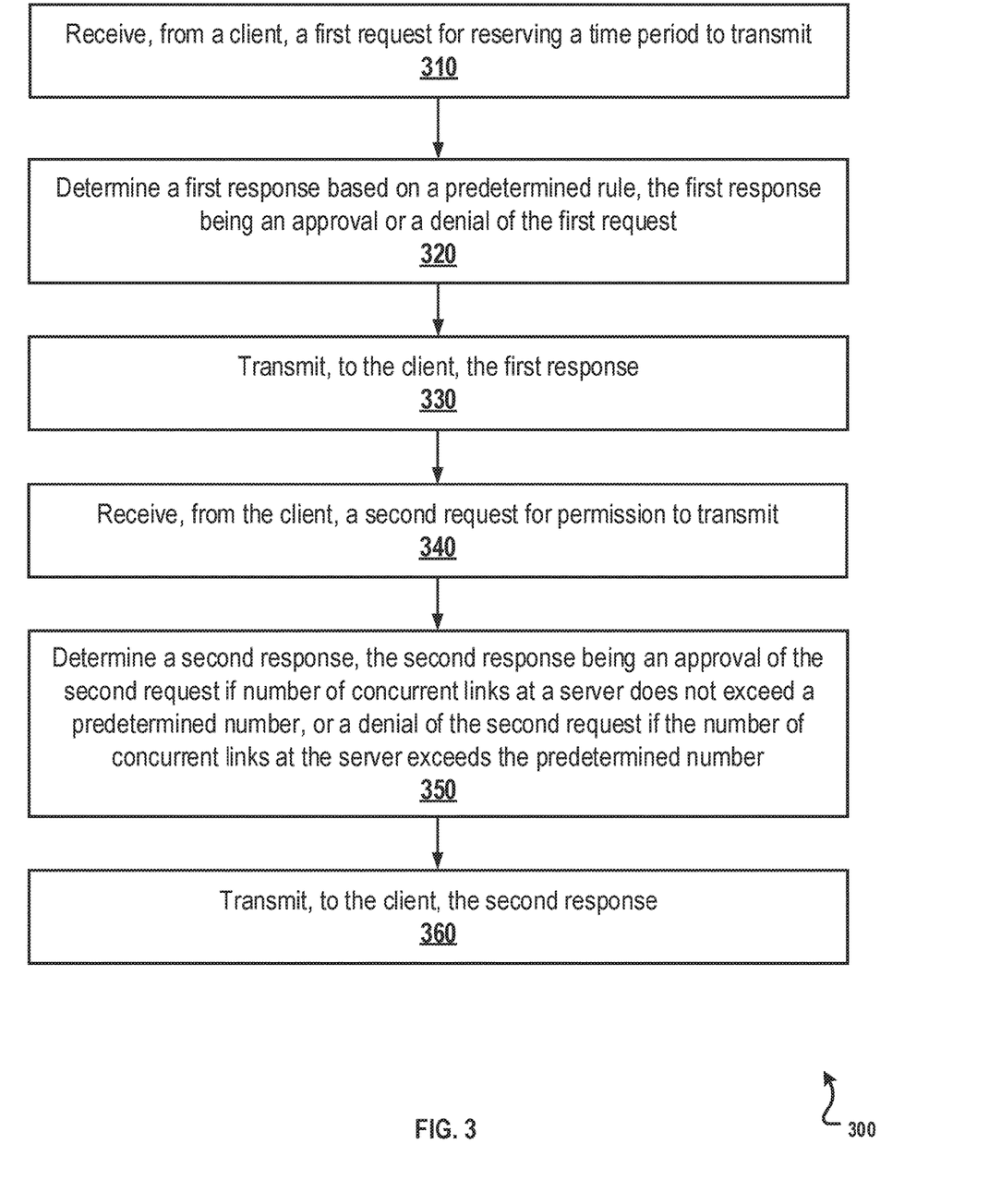
FIG. 3 is a flowchart illustrating another example of a method for controlling message output, according to an implementation of the present disclosure.

FIG. 3 is a flowchart illustrating another example of a method 300 for controlling message output, according to an implementation of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order. In some implementations, the method 300 can include additional or different (or a combination of both) steps not shown in the flowchart. In some implementations, various steps of method 300 can also be omitted from the method 300.

At 310, a first request for reserving a time period to transmit is received from a client. From 310, method 300 proceeds to 320.

At 320, a first response is determined based on a predetermined rule. The first response is an approval or a denial of the first request. In some implementations, the predetermined rule is a FCFS rule. For example, when receiving requests for an available time period from more than one client, the available time period is allocated to the client whose request is first received. In some implementations, when the available time period is allocated, a next available time for reservation is updated to the end of the available time period. As a result, an approval of the request is determined for the client, while requests from other clients are denied. In some implementations, the predetermined rule is a rule based on a priority of a requesting client among other clients. From 320, method 300 proceeds to 330.

At 330, the first response is transmitted to the client. From 330, method 300 proceeds to 340.

At 340, a second request for permission to transmit is received from the client. From 340, method 300 proceeds to 350.

At 350, a second response is determined for the second request. The second response is an approval or a denial of the second request. In some implementations, a concurrent token is used as permission to transmit. In some implementations, number of concurrent links, established at a server to which the client intends to transmit, is obtained. If the number of concurrent links at the server does not exceed a predetermined number, the second response is determined to be an approval of the second request (such as, granting a concurrent token). On the other hand, if the number of concurrent links at the server exceeds the predetermined number, the second response is determined to be a denial of the second request (such as, denying a concurrent token). In some implementations, the predetermined number is based on the server's processing capability. From 350, method 300 proceeds to 360.

At 360, the second response is transmitted to the client. After 360, method 300 stops.

Figure 4:
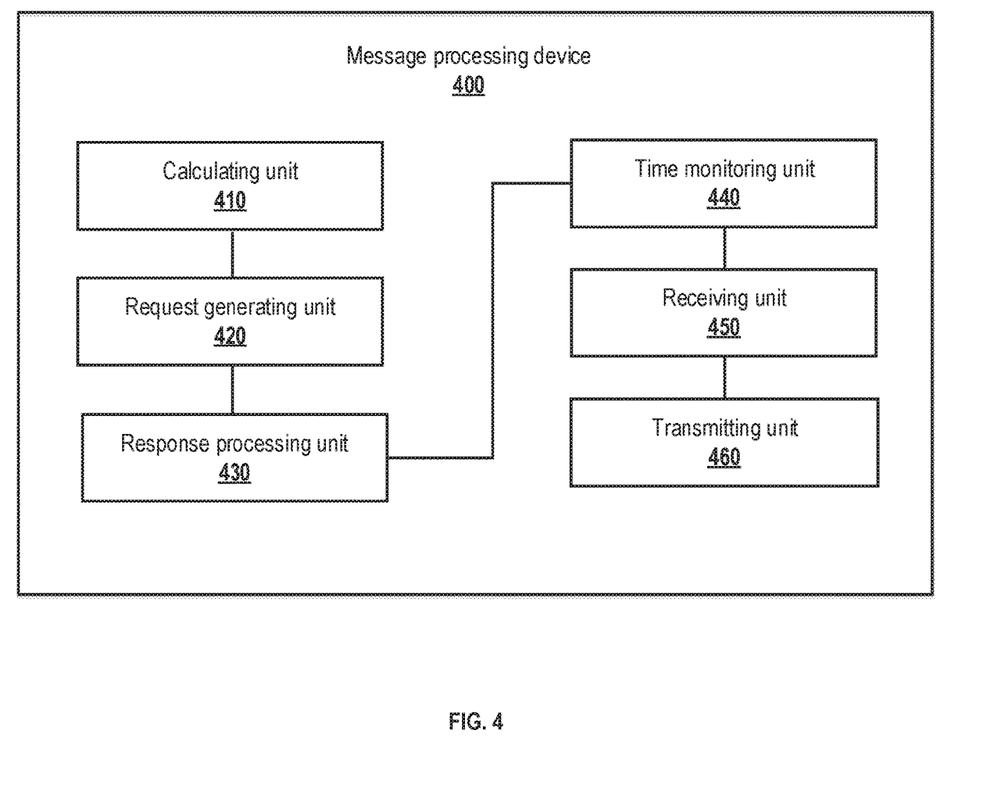
FIG. 4 is a block diagram illustrating an example message processing device for controlling message output, according to an implementation of the present disclosure.

FIG. 4 is a block diagram illustrating an example message processing device 400 for controlling message output, according to an implementation of the present disclosure. For clarity of presentation, the description that follows generally describes device 400 in the context of the other figures in this description. The device 400 can include a calculating unit 410, a request generating unit 420, a response processing unit 430, a time monitoring unit 440, a receiving unit 450, and a transmitting unit 460, which can be implemented in hardware, software, or both. In some implementations, the device 400 can include additional or different (or a combination of both) components not shown in the block diagram. In some implementations, components can also be omitted from the device 400.

The calculating unit 410 can, for example, calculate a duration to transmit multiple messages and transmit time for each message of the multiple messages, as discussed in steps 210 and 230 of FIG. 2. The request generating unit 420 can, for example, generate a first request and a second request, as discussed in steps 220 and 250 of FIG. 2. The response processing unit 430 can, for example, process a first response and a second response, as discussed in steps 230 and 260 of FIG. 2. The time monitoring unit 440 can, for example, monitor calculated transmit time of the multiple messages, as discussed in step 240 of FIG. 2. The receiving unit 450 can, for example, receive a first response and a second response, as discussed in steps 230 and 260 of FIG. 2. The transmitting unit 460 can, for example, transmit a first request, a second request, and a message as discussed in steps 220, 250, and 260 of FIG. 2.

Figure 5:
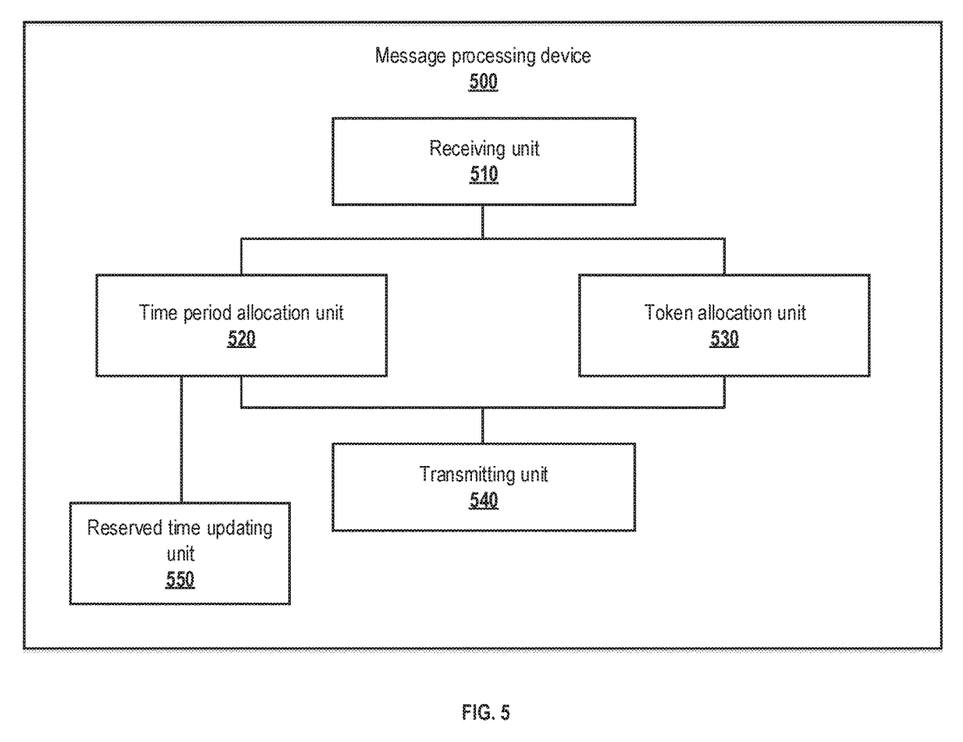
FIG. 5 is a block diagram illustrating another example message processing device for controlling message output, according to an implementation of the present disclosure.

FIG. 5 is a block diagram illustrating another example message processing device 500 for controlling message output, according to an implementation of the present disclosure. For clarity of presentation, the description that follows generally describes device 500 in the context of the other figures in this description. The device 500 can include a receiving unit 510, a time period allocation unit 520, a token allocation unit 530, a transmitting unit 540, and a reserved time updating unit 550, which can be implemented in hardware, software, or both. In some implementations, the device 500 can include additional or different (or a combination of both) components not shown in the block diagram. In some implementations, components can also be omitted from the device 500.

The receiving unit 510 can, for example, receive a first request and a second request, as discussed in steps 310 and 340 of FIG. 3. The time period allocation unit 520 can, for example, allocate an available time period and update a next available time for reservation, as discussed in step 320 of FIG. 3. The token allocation unit 530 can, for example, allocate a concurrent token used as permission to transmit, as discussed in step 350 of FIG. 3. The transmitting unit 540 can, for example, transmit a first response and a second response, as discussed in steps 330 and 360 of FIG. 3. The reserved time updating unit 550 can, for example, update a next available time for reservation, as discussed in step 320 of FIG. 3.

Figure 6:
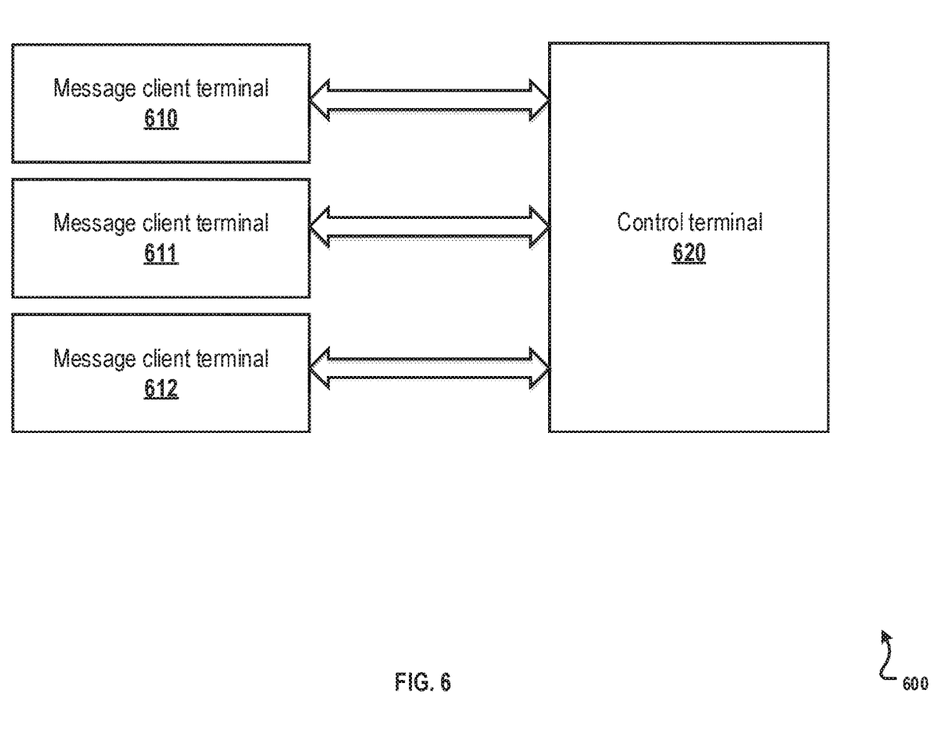
FIG. 6 is a block diagram illustrating an example message processing system for controlling message output, according to an implementation of the present disclosure.

FIG. 6 is a block diagram illustrating an example message processing system 600 for controlling message output, according to an implementation of the present disclosure. For clarity of presentation, the description that follows generally describes system 600 in the context of the other figures in this description. The system 600 can include message client terminals 610, 611, and 612, and a control terminal 620, which can be implemented in hardware, software, or both. Each message client terminal can be a client or a server, and the control terminal 620 can be a controller, as discussed in FIGS. 1-3. In some implementations, the system 600 can include additional or different (or a combination of both) components not shown in the block diagram. In some implementations, components can also be omitted from the system 600.

Figure 7:
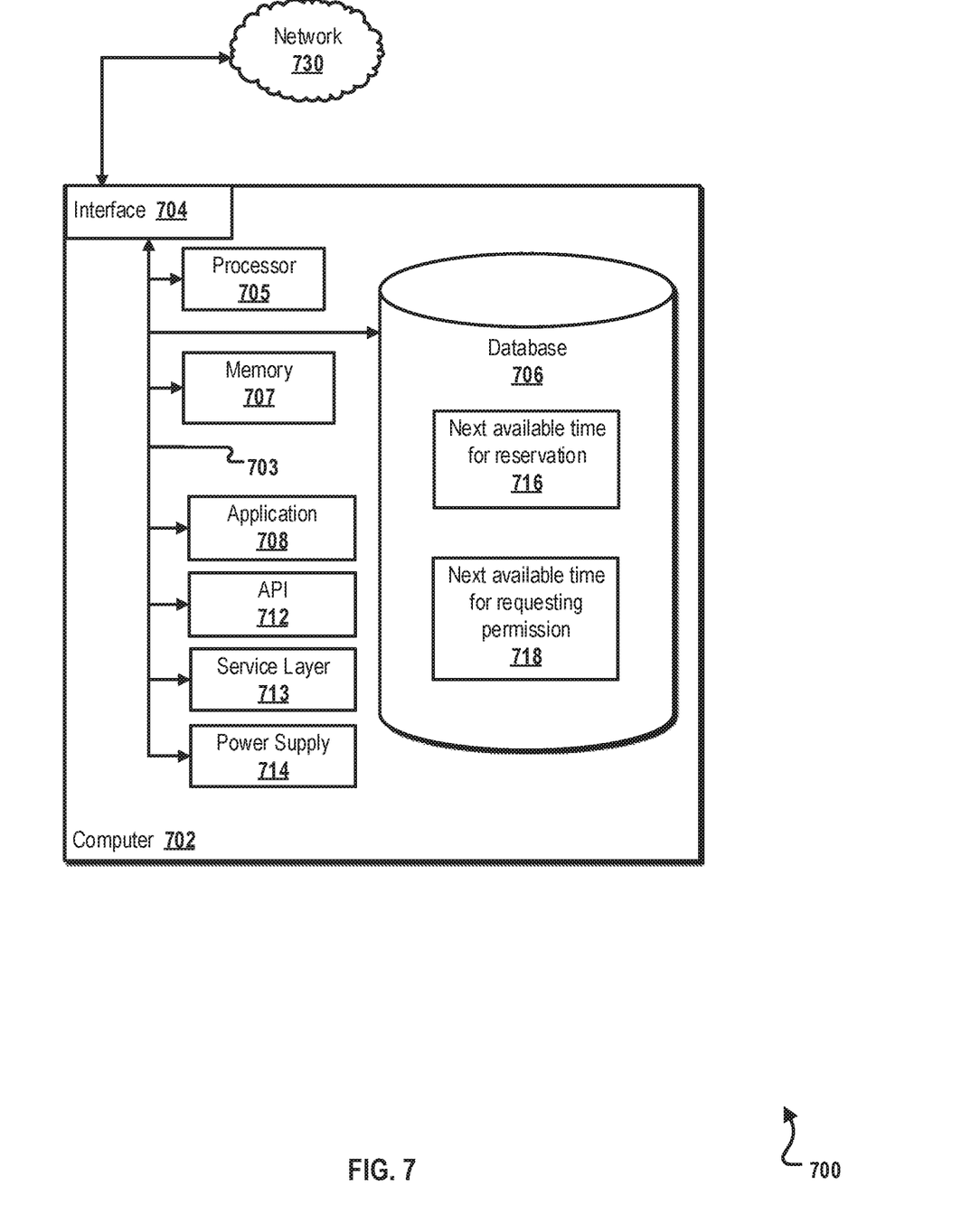
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure.

The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 can hold the previously described next available time for reservation 716 and the previously described next available time for requesting permission 718.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method, comprising: calculating a duration to transmit a plurality of messages; transmitting a first request based on the calculated duration, wherein the first request is a request for reserving a time period to transmit; and in response to receiving an approval of the first request: for each message in the plurality of messages, calculating a transmit time; determining that a current time exceeds a particular transmit time for a particular message; in response to determining that a current time exceeds a particular transmit time for a particular message, transmitting a second request, wherein the second request is a request for permission to transmit; and in response to receiving an approval of the second request, transmitting the particular message.

The foregoing and other described implementations can each, optionally, include one or more of the following features:

A first feature, combinable with any of the following features, wherein the duration is calculated based on number of messages in the plurality of messages and a transmitting interval between two consecutive messages in the plurality of messages.

A second feature, combinable with any of the previous or following features, wherein transmitting the first request comprises: obtaining a next available time for reservation; and calculating the time period to transmit as a time period between the next available time for reservation and sum of the next available time for reservation and the calculated duration.

A third feature, combinable with any of the previous or following features, further comprising, in response to receiving a denial of the first request: calculating a second time period to transmit based on a next available time for reservation; and transmitting a third request for reserving the second time period to transmit.

A fourth feature, combinable with any of the previous or following features, wherein the denial of the first request includes the next available time for reservation.

A fifth feature, combinable with any of the previous or following features, further comprising, in response to receiving a denial of the second request: obtaining a next available time for requesting permission; determining that the current time exceeds the next available time for requesting permission; and in response to determining that the current time exceeds the next available time for requesting permission, retransmitting the second request.

In a second implementation, a non-transitory, computer-readable medium storing one or more instructions executable by a computer system to perform operations comprising: calculating a duration to transmit a plurality of messages; transmitting a first request based on the calculated duration, wherein the first request is a request for reserving a time period to transmit; and in response to receiving an approval of the first request: for each message in the plurality of messages, calculating a transmit time; determining that a current time exceeds a particular transmit time for a particular message; in response to determining that a current time exceeds a particular transmit time for a particular message, transmitting a second request, wherein the second request is a request for permission to transmit; and in response to receiving an approval of the second request, transmitting the particular message.

The foregoing and other described implementations can each, optionally, include one or more of the following features:

A first feature, combinable with any of the following features, wherein the duration is calculated based on number of messages in the plurality of messages and a transmitting interval between two consecutive messages in the plurality of messages.

A second feature, combinable with any of the previous or following features, wherein transmitting the first request comprises: obtaining a next available time for reservation; and calculating the time period to transmit as a time period between the next available time for reservation and sum of the next available time for reservation and the calculated duration.

A third feature, combinable with any of the previous or following features, the operations further comprising, in response to receiving a denial of the first request: calculating a second time period to transmit based on a next available time for reservation; and transmitting a third request for reserving the second time period to transmit.

A fourth feature, combinable with any of the previous or following features, wherein the denial of the first request includes the next available time for reservation.

A fifth feature, combinable with any of the previous or following features, the operations further comprising, in response to receiving a denial of the second request: obtaining a next available time for requesting permission; determining that the current time exceeds the next available time for requesting permission; and in response to determining that the current time exceeds the next available time for requesting permission, retransmitting the second request.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: calculating a duration to transmit a plurality of messages; transmitting a first request based on the calculated duration, wherein the first request is a request for reserving a time period to transmit; and in response to receiving an approval of the first request: for each message in the plurality of messages, calculating a transmit time; determining that a current time exceeds a particular transmit time for a particular message; in response to determining that a current time exceeds a particular transmit time for a particular message, transmitting a second request, wherein the second request is a request for permission to transmit; and in response to receiving an approval of the second request, transmitting the particular message.

The foregoing and other described implementations can each, optionally, include one or more of the following features:

A first feature, combinable with any of the following features, wherein the duration is calculated based on number of messages in the plurality of messages and a transmitting interval between two consecutive messages in the plurality of messages.

A second feature, combinable with any of the previous or following features, wherein transmitting the first request comprises: obtaining a next available time for reservation; and calculating the time period to transmit as a time period between the next available time for reservation and sum of the next available time for reservation and the calculated duration.

A third feature, combinable with any of the previous or following features, the operations further comprising, in response to receiving a denial of the first request: calculating a second time period to transmit based on a next available time for reservation; and transmitting a third request for reserving the second time period to transmit.

A fourth feature, combinable with any of the previous or following features, wherein the denial of the first request includes the next available time for reservation.

A fifth feature, combinable with any of the previous or following features, the operations further comprising, in response to receiving a denial of the second request: obtaining a next available time for requesting permission; determining that the current time exceeds the next available time for requesting permission; and in response to determining that the current time exceeds the next available time for requesting permission, retransmitting the second request.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising: calculating a duration to transmit a plurality of messages;
    transmitting a first request based on the calculated duration, wherein the first request is a request for reserving a time period to transmit, the time period being set between an obtained next available time for reservation and sum of the obtained next available time for reservation and the calculated duration, to transmit; and
    in response to receiving an approval of the first request:
    for each message in the plurality of messages, calculating a time of transmission;
    determining that a current time is on or after a particular time of transmission for a particular message;
    in response to determining that the current time is on or after the particular time of transmission for the particular message, transmitting a second request to a controller, wherein the second request is a request for permission to transmit the particular message, wherein the controller determines an approval of the second request when a number of transmission links associated with a server which the particular message is intended to be transmitted to is smaller than a predetermined number; and in response to receiving an approval of the second request, transmitting the particular message; and in response to receiving a denial of the first request:
calculating an updated time period to transmit based on an updated next available time for reservation, wherein the denial of the first request includes the updated next available time for reservation; and
transmitting another request for reserving the updated time period to transmit.

2. The method of claim 1, wherein the duration is calculated based on number of messages in the plurality of messages and a transmitting interval between two consecutive messages in the plurality of messages.

3. The method of claim 1, further comprising, in response to receiving a denial of the second request:
obtaining a next available time for requesting permission;
determining that the current time exceeds the next available time for requesting permission; and
in response to determining that the current time exceeds the next available time for requesting permission, retransmitting the second request.

4. A non-transitory, computer-readable medium storing one or more instructions executable by a computer system to perform operations comprising:
calculating a duration to transmit a plurality of messages;
transmitting a first request based on the calculated duration, wherein the first request is a request for reserving a time period to transmit, the time period being set between an obtained next available time for reservation and sum of the obtained next available time for reservation and the calculated duration, to transmit; and
in response to receiving an approval of the first request:
for each message in the plurality of messages, calculating a time of transmission;
determining that a current time is on or after a particular time of transmission for a particular message;
in response to determining that the current time is on or after the particular time of transmission for the particular message, transmitting a second request to a controller, wherein the second request is a request for permission to transmit the particular message, wherein the controller determines an approval of the second request when a number of transmission links associated with a server which the particular message is intended to be transmitted to is smaller than a predetermined number; and
in response to receiving an approval of the second request, transmitting the particular message; and
in response to receiving a denial of the first request:
calculating an updated time period to transmit based on an updated next available time for reservation, wherein the denial of the first request includes the updated next available time for reservation; and
transmitting another request for reserving the updated time period to transmit.

5. The non-transitory, computer-readable medium of claim 4, wherein the duration is calculated based on number of messages in the plurality of messages and a transmitting interval between two consecutive messages in the plurality of messages.

6. The non-transitory, computer-readable medium of claim 4, the operations further comprising, in response to receiving a denial of the second request:
obtaining a next available time for requesting permission;
determining that the current time exceeds the next available time for requesting permission; and
in response to determining that the current time exceeds the next available time for requesting permission, retransmitting the second request.

7. A computer-implemented system, comprising: one or more computers; and
one or more computer memory devices interoperably coupled with the one or more computers and having tangible, non-transitory, machine-readable media storing instructions that, when executed by the one or more computers, perform operations comprising: calculating a duration to transmit a plurality of messages;
transmitting a first request based on the calculated duration, wherein the first request is a request for reserving a time period to transmit, the time period being set between an obtained next available time for reservation and sum of the obtained next available time for reservation and the calculated duration, to transmit; and in response to receiving an approval of the first request:
for each message in the plurality of messages, calculating a time of transmission;
determining that a current time is on or after a particular time of transmission for a particular message;
in response to determining that the current time is on or after theffall particular time of transmission for the particular message, transmitting a second request to a controller, wherein the second request is a request for permission to transmit the particular message, wherein the controller determines an approval of the second request when a
number of transmission links associated with a server which the particular message is intended to be transmitted to is smaller than a predetermined number; and
in response to receiving an approval of the second request, transmitting the particular message; and
in response to receiving a denial of the first request:
calculating an updated time period to transmit based on an updated next available time for reservation, wherein the denial of the first request includes the updated next available time for reservation; and
transmitting another request for reserving the updated time period to transmit.

8. The system of claim 7, wherein the duration is calculated based on number of messages in the plurality of messages and a transmitting interval between two consecutive messages in the plurality of messages.

9. The system of claim 7, the operations further comprising, in response to receiving a denial of the second request:
obtaining a next available time for requesting permission;
determining that the current time exceeds the next available time for requesting permission; and
in response to determining that the current time exceeds the next available time for requesting permission, retransmitting the second request.

10. The method of claim 1, further comprising:
in response to receiving a denial of the first request, receiving information related to a plurality of denials comprising the denial of the first request, wherein a quantity of the plurality of denials is greater than a predetermined number.

11. The method of claim 3, further comprising:
determining whether the current time is before a sum of the particular time of transmission and an expiration time; and
in response to determining that the current time is before the sum of the particular time of transmission and the expiration time, retransmitting the second request.

12. The method of claim 1, further comprising:
monitoring an output queue periodically to determine whether the current time is on or after the time of transmission for each message in the plurality of messages, wherein the output queue stores the plurality of messages.

* * * * *

UNITED STATES PATENT AND TRADEMARK OFFICE
CERTIFICATE OF CORRECTION

PATENT NO. : 10,700,993 B2
APPLICATION NO. : 15/818504
DATED : June 30, 2020
INVENTOR(S) : Mengjun Huang Page 1 of 1

It is certified that error appears in the above-identified patent and that said Letters Patent is hereby corrected as shown below:

In the Claims

In Claim 4, Column 19, Line 56, delete "request;" and insert -- request: --, therefor.

In Claim 7, Column 20, Line 32, delete "theffall" and insert -- the --, therefor.

Signed and Sealed this
Twentieth Day of October, 2020

Andrei Iancu
*Director of the United States Patent and Trademark Office*